US010159014B1

(12) United States Patent
Parihar et al.

(10) Patent No.: US 10,159,014 B1
(45) Date of Patent: Dec. 18, 2018

(54) RELAY NODE BACKHAUL BANDWIDTH ALLOCATION BASED ON PRIORITY OF SMALL RELAY NODES

(71) Applicant: Sprint Spectrum LP, Overland Park, KS (US)

(72) Inventors: Vanil Parihar, Overland Park, KS (US); Nitesh Manchanda, Overland Park, KS (US); Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/729,585

(22) Filed: Oct. 10, 2017

(51) Int. Cl.
  *H04W 28/08* (2009.01)
  *H04W 84/04* (2009.01)
  *H04W 24/02* (2009.01)
  *H04W 72/10* (2009.01)
  *H04W 16/26* (2009.01)

(52) U.S. Cl.
  CPC ............ *H04W 28/08* (2013.01); *H04W 16/26* (2013.01); *H04W 24/02* (2013.01); *H04W 72/10* (2013.01); *H04W 84/045* (2013.01)

(58) Field of Classification Search
  CPC ............... H04W 28/08; H04W 84/045; H04W 28/0284; H04W 28/0289; H04W 40/22; H04W 76/025; H04W 24/02; H04W 72/10; H04B 7/15557
  See application file for complete search history.

(56) References Cited

U.S. PATENT DOCUMENTS

| 7,899,451 | B2* | 3/2011 | Hu | H04W 48/17 |
| | | | | 370/328 |
| 9,445,389 | B1* | 9/2016 | Kullman | H04W 64/003 |
| 9,813,966 | B1* | 11/2017 | Park | H04W 36/30 |
| 2003/0068975 | A1* | 4/2003 | Qiao | H04W 88/04 |
| | | | | 455/11.1 |
| 2011/0211467 | A1* | 9/2011 | Bhat | H04B 7/15542 |
| | | | | 370/252 |
| 2012/0063417 | A1* | 3/2012 | Redana | H04W 36/22 |
| | | | | 370/331 |
| 2013/0223227 | A1* | 8/2013 | Lee | H04B 7/15557 |
| | | | | 370/236 |
| 2016/0345250 | A1* | 11/2016 | Agyapong | H04W 48/16 |
| 2017/0099617 | A1* | 4/2017 | Tomici | H04W 28/08 |
| 2017/0163360 | A1* | 6/2017 | Raghavan | H04B 17/309 |

* cited by examiner

*Primary Examiner* — Nizar N Sivji (57) ABSTRACT

Systems, methods, and processing nodes are related to allocating bandwidth in a wireless network. A method includes identifying a plurality of small cell relay nodes connected to a relay node. The method further includes determining priority data indicative of resource utilization by each of the plurality of small cell relay nodes and types of services utilized by wireless devices connected to each of the plurality of small cell relay nodes. Additionally, the method includes determining a priority for each of the plurality of small cell relay nodes based at least partially the priority data. The method also includes allocating backhaul bandwidth of the relay node to each of the plurality of small cell relay nodes based at least partially on the priority for each of the plurality of small cell relay nodes.

14 Claims, 8 Drawing Sheets

RELAY NODE BACKHAUL BANDWIDTH ALLOCATION BASED ON PRIORITY OF SMALL RELAY NODES

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes, such as mini-macro access nodes, that are configured to function as relay nodes for relaying communication from macrocell access node, e.g., a macro base station or eNodeB, that functions as a donor access node, to a wireless device. Relay nodes may be used at the edge of a coverage area of a donor access node to improve coverage and/or service, as well as in crowded areas having a high number of other wireless devices to increase the available throughput to the wireless devices being relayed.

To connect with the macrocell access node, a relay node can be utilized to establish communication between the small relay nodes and the macrocell access node. For example, multiple small relay nodes can be cascaded via single relay node. The single relay node, however, can create a bottleneck for wireless devices connected to the small relay nodes. Currently, the relay node provides an equal amount of backhaul bandwidth to each of the small relay nodes. The small relay nodes, however, may have different priorities based on the type of wireless devices attached to the small relay nodes.

OVERVIEW

Exemplary embodiments described herein include systems, methods, and processing nodes for allocating bandwidth in a wireless network. An exemplary method for minimizing bottlenecks in a wireless network includes identifying a plurality of small cell relay nodes connected to a relay node. The method further includes determining priority data indicative of resource utilization by each of the plurality of small cell relay nodes and types of services utilized by wireless devices connected to each of the plurality of small cell relay nodes. Additionally, the method includes determining a priority for each of the plurality of small cell relay nodes based at least partially the priority data. The method also includes allocating backhaul bandwidth of the relay node to each of the plurality of small cell relay nodes based at least partially on the priority for each of the plurality of small cell relay nodes.

An exemplary system for minimizing interference in a wireless network includes a processing node and a processor coupled to the processing node. The processor configures the processing node to determine priority data indicative of resource utilization by each of a plurality of small cell relay nodes and types of services utilized by wireless devices connected to each of the plurality of small cell relay nodes, and determine a priority for each of the plurality of small cell relay nodes based at least partially the priority data. The priority for each of the plurality of small cell relay nodes is utilized to allocate backhaul bandwidth of a relay node connected to the plurality of small cell relay nodes.

An exemplary processing node for minimizing interference in a wireless network is configured to perform operations including identifying a plurality of small cell relay nodes connected to a relay node. The operations further include determining a priority for each of the plurality of small cell relay nodes. The priority determined for each of the plurality of small cell relay nodes is based at least partially on resource utilization by each of the plurality of small cell relay nodes and types of services utilized by wireless devices connected to each of the plurality of small cell relay nodes. Also, the operations include allocating bandwidth to each of the plurality of small cell relay nodes based at least partially on the priority for each of the plurality of small cell relay nodes.

DETAILED DESCRIPTION

In embodiments of the present disclosure, a wireless network can be designed to mitigate bottlenecks created by cascading small cell relay nodes in a wireless network. In embodiments, a relay node allocates backhaul bandwidth based on a priority of each small relay node connected to the relay node. The priority for each of the plurality of small cell relay is a value that represents a small cell relay nodes need or requirements in accessing and utilizing backhaul bandwidth provided by the relay node. For example, a higher priority can represent a higher need or requirement for backhaul bandwidth and lower priority can represent a lower need or requirement for backhaul bandwidth.

In embodiments, the priority for the plurality of small cell relay nodes can be determined based on priority data determined for the small cell relay nodes. The priority data can be determined that indicates an amount of backhaul bandwidth, an importance in access bandwidth, and the like. In embodiments, the priority data can include data that represents utilization by each of the plurality of small cell relay nodes and types of services utilized by wireless devices connected to each of the plurality of small cell relay nodes. For instance, the utilization can represent a percentage of physical resource blocks (PRBs) utilized by each of the plurality of small cell relay nodes. Likewise, for instance, the type of services utilized can represent a quality of service (e.g., quality of service (QOS) class identifier (QCI)), that is guaranteed, offer, or provided to the wireless devices connected to each of the plurality of small cell relay nodes.

Once the priority is determined for each of the plurality of small cell access nodes, backhaul bandwidth of the relay node supporting the small cell access nodes is allocated to each of the plurality of small cell relay nodes. In embodiments, the total backhaul bandwidth of the relay node is allocated to the each of the plurality of small cell relay nodes based on the priority among the plurality of small cell relay nodes. For example, each of the plurality of small cell relay nodes can be allocated a percentage of the total available backhaul bandwidth. In embodiments, the percentage of backhaul bandwidth allocated to among the small cell relay nodes is relative to the priorities of small cell relay nodes communicating with the relay node. The small cell relay nodes with higher priorities are assigned a higher percentage relative to lower priority small cell relay nodes.

By allocating backhaul bandwidth based on priority, the resources of the relay and the wireless network can be more efficiently utilized. Additionally, by prioritizing the allocation of bandwidth, the end-user wireless device can be provided improved quality of service. These and additional operations are further described with respect to the embodiments depicted in FIGS. 1, 2A-2C, and 3-6 below.

Figure 1:
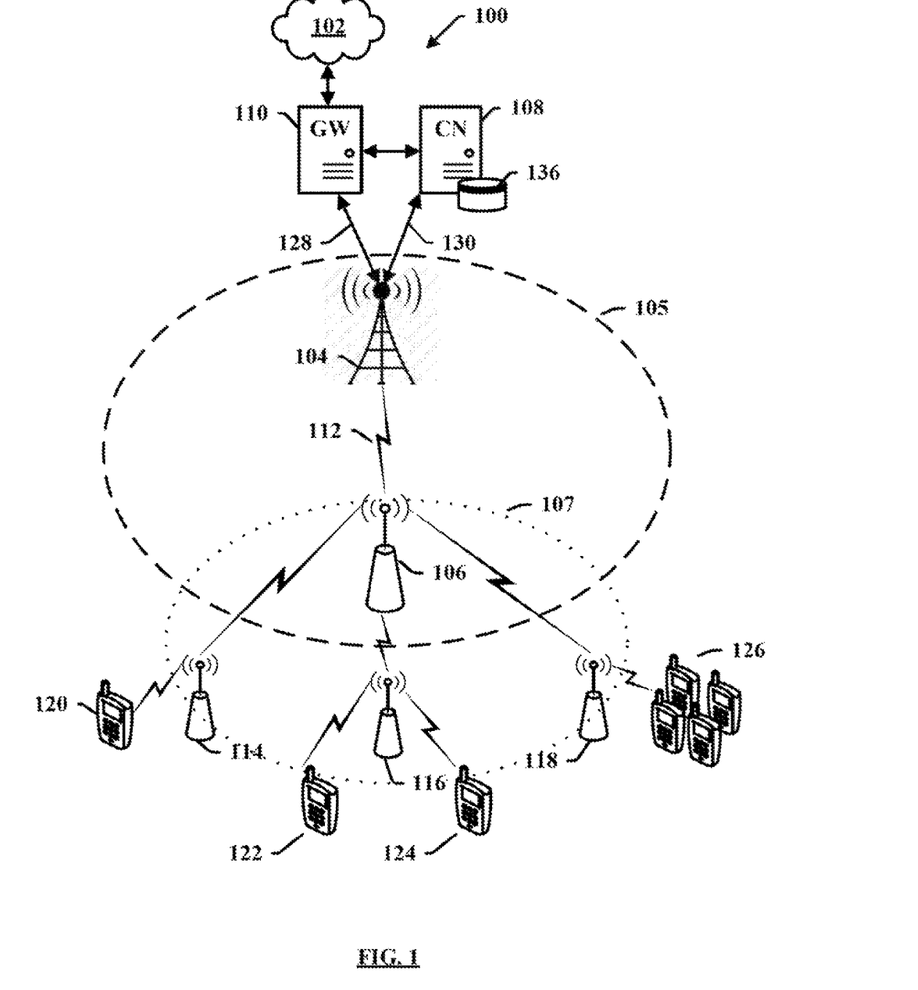
FIG. 1 depicts an exemplary system for a system for minimizing bandwidth bottlenecks in a wireless network, according to embodiments of the present disclosure.

FIG. 1 depicts an example of a communication system 100 for minimizing bottlenecks in a wireless network. While FIG. 1 illustrates various components contained in the communication system 100, FIG. 1 illustrates one example of a communications system and additional components can be added and existing components can be removed.

As illustrated in FIG. 1, the communication system 100 includes a communication network 102, an access node 104, a relay node 106, a controller node 108, and a gateway node 110. Other network elements can be present in the communication system 100 to facilitate communication but are omitted for clarity, such as base stations, base station controllers, mobile switching centers, dispatch application processors, and location registers such as a home location register or visitor location register. Furthermore, other network elements can be present to facilitate communication between the access node 104 and the communication network 102 which are omitted for clarity, including additional processing nodes, routers, gateways, and physical and/or wireless data links for carrying data among the various network elements.

The access node 104 is illustrated as having a coverage area 105, with the relay node 106 being located within the coverage area 105 and accessing network services directly from the access node 104 via an air interface 112 deployed by the access node 104. The relay node 106 can be deployed with in the coverage area 105 to provide an increased coverage area 107. In other words, relay node 106 can act as a wireless access point for wireless devices and communicates with access node 104 via air interface 112, hereinafter referred to as a relay backhaul air interface, or simply "backhaul," and the access node 104 may be referred to as a donor access node. Wireless devices, which are outside coverage area 111 such as one or more small relay nodes 114, 116, and 118 and one or more wireless devices 120, 122, 124, and 126, can still access network services from the access node 104 by virtue of being within coverage area 107 of relay node 106.

The small relay nodes 114, 116, and 118 communicate with the relay node 106. The relay node 106 provides the backhaul channel to the small relay nodes 114, 116, and 118 for accessing network services. The one or more small relay nodes 114, 116, and 118 can be deployed within the increased coverage area 107 to provide additional coverage area. In other words, the one or more small relay nodes 114, 116, and 118 can act as wireless access points for the one or more wireless devices 120, 122, 124, and 126 and communicates with the relay node 106. One or more wireless devices 120, 122, 124, and 126 communicate with the small relay nodes 114, 116, and 118 for accessing network services.

In embodiments, the relay node 106 allocates backhaul bandwidth based on a priority for each of the small relay nodes 114, 116, and 118 connected to the relay node 106. The priority for each of the small relay nodes 114, 116, and 118 is a value that represents a small cell relay nodes need or requirements in accessing and utilizing backhaul bandwidth provided by the relay node 106. For example, a higher priority can represent a higher need or requirement for backhaul bandwidth and lower priority can represent a lower need or requirement for backhaul bandwidth.

In embodiments, the priority for the small relay nodes 114, 116, and 118 can be determined based on priority data determined for the small relay nodes 114, 116, and 118. The priority data can be determined that indicates an amount of backhaul bandwidth, an importance in access bandwidth, and the like. In embodiments, the priority data can include data that represents utilization by each of the small relay nodes 114, 116, and 118 and types of services utilized by the wireless devices 120, 122, 124, and 126 connected to each of the small relay nodes 114, 116, and 118. For instance, the utilization can represent a percentage of physical resource blocks (PRBs) utilized by each of the small relay nodes 114, 116, and 118. Likewise, for instance, the type of services utilized can represent a quality of service (e.g., quality of service (QOS) class identifier (QCI)), that is guaranteed, offer, or provided to the wireless devices 120, 122, 124, and 126 connected to each of the small relay nodes 114, 116, and 118.

Once the priority is determined for each of the plurality of small cell access nodes, backhaul bandwidth of the relay node 106 supporting the small relay nodes 114, 116, and 118 is allocated to each of the small relay nodes 114, 116, and 118. In embodiments, the total backhaul bandwidth of the relay node 106 is allocated to the each of the small relay nodes 114, 116, and 118 based on the priority among the one or more small relay nodes 114, 116, and 118. For example, each of the small relay nodes 114, 116, and 118 can be allocated a percentage of the total available backhaul bandwidth. In embodiments, the percentage of backhaul bandwidth allocated to among the small relay nodes 114, 116, and 118 is relative to the priorities of small relay nodes 114, 116, and 118 communicating with the relay node 106. The small relay nodes 114, 116, and 118 with higher priorities are assigned a higher percentage relative to lower priority small relay nodes 114, 116, and 118.

The communication network 102 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). The communication network 102 can be capable of carrying data, for example, to support voice, push-to-talk, broadcast video, and data communications by the wireless devices 120, 122, 124 and 126, the small relay nodes 114, 116 and 118, the relay node 106, etc. Wireless network protocols can include multimedia broadcast multicast service (MBMS), code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that can be utilized by the communication network 102 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network 102 can also include additional base stations, controller nodes, telephony switches, internet routers, network gateways, computer systems, communication links, or some other type of communication equipment, and combinations thereof.

The access node 104 and the relay node 106 can be any network node configured to provide communication between the wireless devices 120, 122, 124 and 126, the small relay nodes 114, 116 and 118, and the communication network 102, including standard access nodes and/or short range, low power, small access nodes. For instance, the access node 104 and the relay node 106 can include any standard access node, such as a macrocell access node, base transceiver station, a radio base station, an eNodeB device, an enhanced eNodeB device, or the like. In other embodiments, the access node 104 and the relay node 106 can be a small access node including a microcell access node, a picocell access node, a femtocell access node, or the like such as a home NodeB or a home eNodeB device.

The access node 104 and the relay node 106 can include a plurality of antennae and transceivers for enabling communication using various operating modes and different frequency bands or carriers and establishing communication links, e.g., air interface 112, with the wireless devices 120, 122, 124 and 126, the small relay nodes 114, 116 and 118, and the like. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), —including combinations, improvements, or variations thereof. Moreover, it is noted that while the access node 104 and the relay node 106 are illustrated in FIG. 1, any number of access nodes and relay nodes can be implemented within the system 100. For example, the relay node 106 can be communicating with a different access node in the communication system 100. Likewise, for example, additional relay nodes can be communicating with the access node 104.

The access node 104 and the relay node 106 can include a processor and associated circuitry to execute or direct the execution of computer-readable instructions to perform operations such as those further described herein. Briefly, the access node 104 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the access node 104 and the relay node 106 can receive instructions and other input at a user interface. The access node 104 and the relay node 106 communicates with the gateway node 110 and controller node 108 via communication links 128, 130. The access node 104 and the relay node 106 can communicate with other access nodes (not shown) using a direct link such as an X2 link or similar link.

The small relay nodes 114, 116 and 118 can be small access nodes including a microcell access node, a picocell access node, a femtocell access node, or the like such as a home NodeB or a home eNodeB device. The small relay nodes 114, 116 and 118 can include a plurality of antennae and transceivers for enabling communication using various operating modes and different frequency bands or carriers and establishing communication links with the wireless devices 120, 122, 124 and 126, the relay node 106, and the like. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), or WiFi, —including combinations, improvements, or variations thereof. Moreover, it is noted that while the small relay nodes 114, 116 and 118 are illustrated in FIG. 1, any number of small relay nodes can be implemented within the system 100.

The small relay nodes 114, 116 and 118 can include a processor and associated circuitry to execute or direct the execution of computer-readable instructions to perform operations such as those further described herein. Briefly, the small relay nodes 114, 116 and 118 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. Further, the access node 104 and the relay node 106 can receive instructions and other input at a user interface.

The wireless devices 120, 122, 124, and 126 can be any device, system, combination of devices, or other such communication platform capable of communicating wirelessly with access nodes, such as the access node 104, the relay node 106, the small relay nodes 114, 116 and 118, and the like, using one or more frequency bands deployed therefrom. The wireless devices 120, 122, 124, and 126 can be, for example, a mobile phone, a wireless phone, a wireless modem, user equipment (UE), a personal digital assistant (PDA), a voice over internet protocol (VoIP) phone, a voice over packet (VOP) phone, or a soft phone, as well as other types of devices or systems that can exchange audio or data via the access node 104, the relay node 106, the small relay nodes 114, 116 and 118. Other types of communication platforms are possible.

The controller node 108 can be any network node configured to communicate information and/or control information over the communication system 100. The controller node 108 can be configured to transmit control information associated with a handover procedure. The controller node 108 can be a standalone computing device, computing system, or network component, and can be accessible, for example, by a wired or wireless connection, or through an indirect connection such as through a computer network or communication network. For example, the controller node 108 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art will recognize that the controller node 108 is not limited to any specific technology architecture, such as LTE and can be used with any network architecture and/or protocol.

The controller node 108 can include a processor and associated circuitry to execute or direct the execution of computer-readable instructions to obtain information. The controller node 108 can retrieve and execute software from storage, which can include a disk drive, a flash drive, memory circuitry, or some other memory device, and which can be local or remotely accessible. In an example, the controller node 108 includes a database 136 for storing priorities of the small relay nodes 114, 116, and 118 and data associated with the priorities, as discussed below. This information can be requested by or shared with the access node 104, the relay node 106, the small relay nodes 114, 116 and 118 via the communication links 130, 122, X2 connections, and so on. The software can include computer programs, firmware, or some other form of machine-readable instructions, and can include an operating system, utilities, drivers, network interfaces, applications, or some other type of software, and combinations thereof. The controller node 108 can receive instructions and other input at a user interface.

The gateway node 110 can be any network node configured to interface with other network nodes using various protocols. The gateway node 110 can communicate user data over the communication system 100. The gateway node 110 can be a standalone computing device, computing system, or network component, and can be accessible, for example, by a wired or wireless connection, or through an indirect connection such as through a computer network or communication network. For example, the gateway node 110 can include a serving gateway (SGW) and/or a public data network gateway (PGW), etc. One of ordinary skill in the art will recognize that the gateway node 110 is not limited to any specific technology architecture, such as LTE and can be used with any network architecture and/or protocol.

The gateway node 110 can include a processor and associated circuitry to execute or direct the execution of computer-readable instructions to obtain information. The gateway node 110 can retrieve and execute software from storage, which can include a disk drive, a flash drive, memory circuitry, or some other memory device, and which can be local or remotely accessible. The software can include computer programs, firmware, or some other form of machine-readable instructions, and can include an operating system, utilities, drivers, network interfaces, applications, or some other type of software, including combinations thereof. The gateway node 110 can receive instructions and other input at a user interface.

The communication links 128, 130 can use various communication media, such as air, space, metal, optical fiber, or some other signal propagation path—including combinations, improvements, or variations thereof. The communication links 128, 130 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, GSM, CDMA, WiMAX, or LTE, —including combinations, improvements, or variations thereof. The communication links 128, 130 can include S1 communications links. Other wireless protocols can also be used. The communication links 128, 130 can be a direct link or might include various equipment, intermediate components, systems, and networks. The communication links 128, 130 can include many different signals sharing the same link.

In the embodiments and examples described above, the access node 104 is described as performing the operations of mitigating interference. In any of the embodiments and examples, however, other elements of the communication network 100 can perform any portion of the process described above.

Other network elements can be present in the communication system 100 to facilitate communication but are omitted for clarity, such as base stations, base station controllers, mobile switching centers, dispatch application processors, and location registers such as a home location register or visitor location register. Furthermore, other network elements that are omitted for clarity can be present to facilitate communication, such as additional processing nodes, routers, gateways, and physical and/or wireless data links for carrying data among the various network elements, e.g. between the access node 104 and the communication network 102.

Figure 2A:
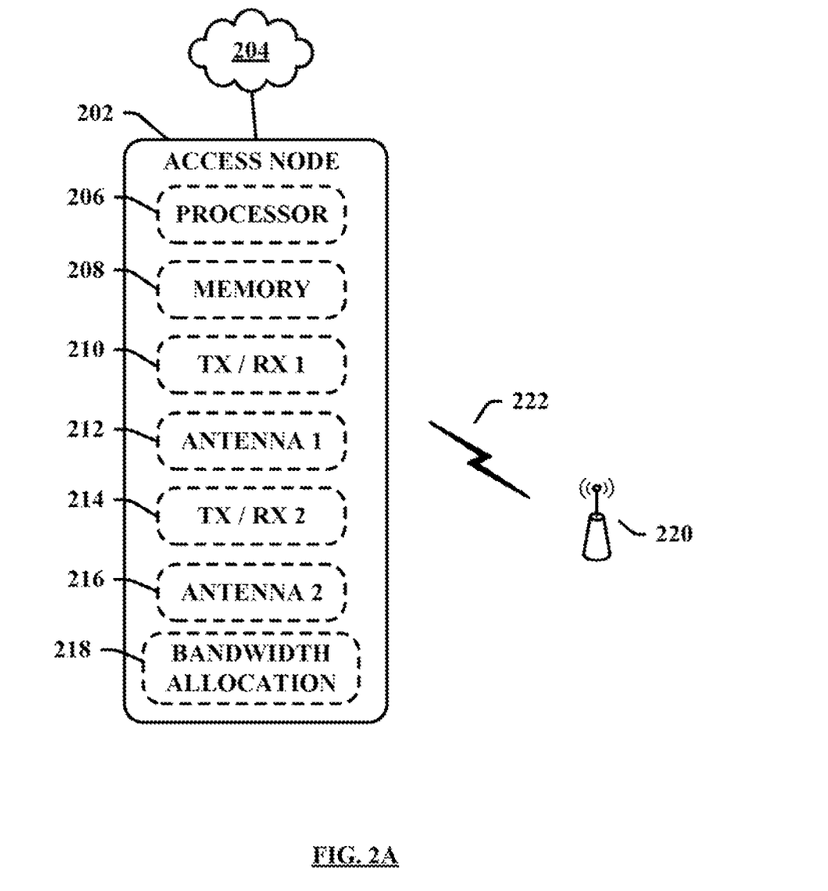
FIG. 2A depicts an example of an access node in a system for minimizing bandwidth bottlenecks in a wireless network, according to embodiments of the present disclosure.

FIG. 2A depicts components of an example of an access node 202 coupled to and communicating with a communication network 204. For example, the access node 202 and communication network 204 can be an example of the access node 104 and communication network 102, as illustrated in FIG. 1. In this example, the access node 202 includes a processor 206, a memory 208, a first transceiver 210, a first antenna 212, a second transceiver 214, and a second antenna 216. The access node 202 can also include a bandwidth allocation unit 218 for performing the processes described herein.

As illustrated, the first transceiver 210, first antenna 212, second transceiver 214, and second antenna 216 can provide communication signals to provide an air link with a relay node 220. For example, the relay node 220 can be an example of the relay node 106, as illustrated in FIG. 1A-1D. The antenna 212 (and/or the antenna 216) can be used to deploy a signal 222 to communicate with the relay node 220. It should be understood that each antenna 214, 216 can comprise a plurality of antennae or antennae arranged in one or more arrays.

In embodiments, the bandwidth allocation unit 218 can configured to perform the determination of priority and allocation of backhaul bandwidth as described herein. In embodiments, the bandwidth allocation unit 218 can be implemented as hardware, software, or combinations thereof. In one example, the bandwidth allocation unit 218 can be implemented as a software program or module that includes logical instructions for performing the process described herein. In this example, a copy of the bandwidth allocation unit 218 can be stored in memory 208 and the logical instructions of the interference mitigation unit 218 can be executed by processor 206.

In another example, the bandwidth allocation unit 218 can be implemented as a hardware unit contain within or coupled to the access node 202. In this example, the bandwidth allocation unit 218 can include one or more processors and associated circuitry to execute or direct the execution of computer-readable instructions to perform operations and processes as described herein. The bandwidth allocation unit 218 can retrieve and execute software, which includes logical instructions for performing the process described herein, from storage. The storage can include a disk drive, a flash drive, memory circuitry, or some other memory device, and which can be local or remotely accessible. The software can comprise computer programs, firmware, or some other form of machine-readable instructions, and can include an operating system, utilities, drivers, network interfaces, applications, or some other type of software, including combinations thereof.

While FIG. 2A illustrates the bandwidth allocation unit 218 being a part of the access node 202, the bandwidth allocation unit 218 can be a part of another device or system communicating with the access node 202. Likewise, the bandwidth allocation unit 218 can be a stand-alone system or device that communicates with the access node 202.

Figure 2B:
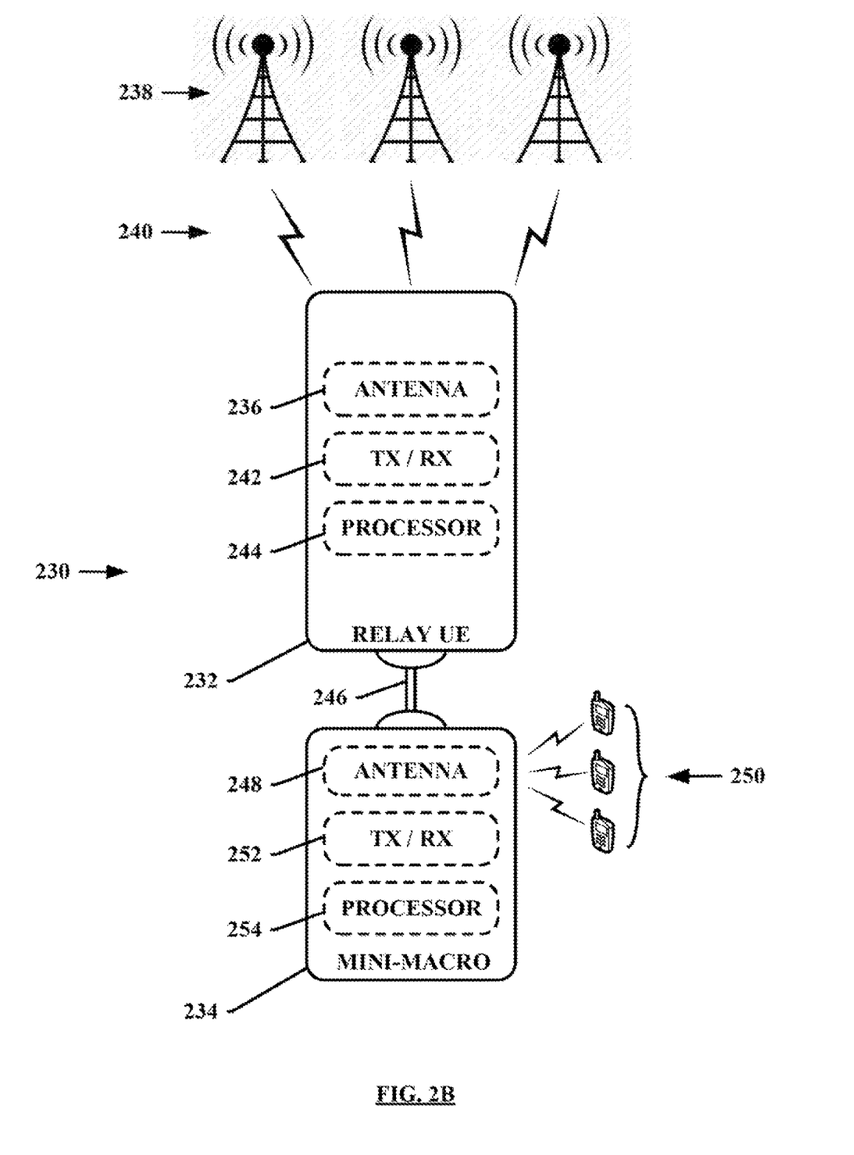
FIGS. 2B and 2C depict examples of relay nodes in a system for minimizing bandwidth bottlenecks in a wireless network, according to embodiments of the present disclosure.

FIG. 2B depicts an example of a small relay node 230, which includes a relay wireless device 232 coupled to a mini-macro access node 234. The relay wireless device 232 can include an antenna 236 for direct (i.e., unrelayed) communication with one or more of access nodes 238 (or relayed communications with a relay node) via communication links 240, a transceiver 242, and a processor 244. For example, the relay node 230 can be an example of one or more of the small relay nodes 114, 116 and 118, as illustrated in FIG. 1. Further, the relay wireless device 232 is coupled to the mini-macro access node 234 via a communication interface 246. The communication interface 246 can be any interface that enables direct communication between the relay wireless device 232 and the mini-macro access node 234, such as USB, FireWire, or any other serial, parallel, analog, or digital interface. The mini-macro access node 234 can include an antenna 248 for wireless communication with one or more wireless devices 250, a transceiver 252, and a processor 254. Although only one transceiver is depicted in each of the relay wireless device 232 and the mini-macro access node 234, additional transceivers can be incorporated in order to facilitate communication across the communication interface 246 and other network elements.

Figure 2C:
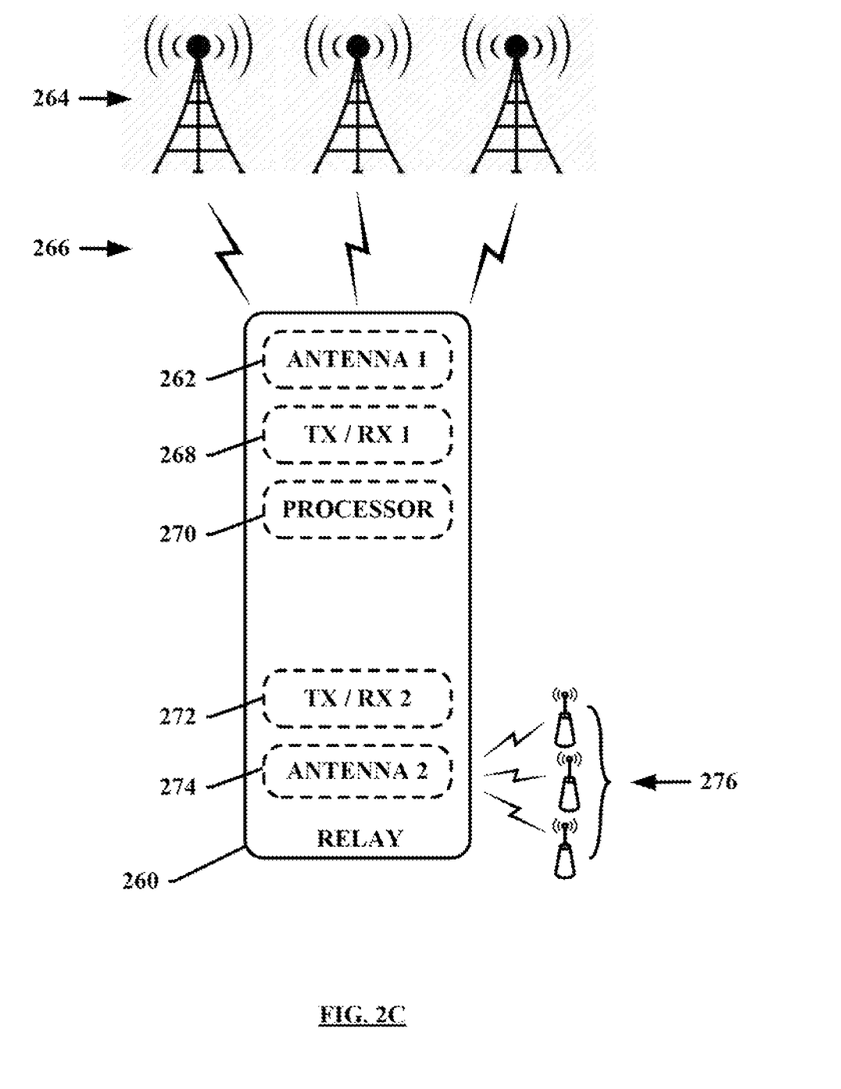

FIG. 2C depicts an example of a relay node 260. The relay node 260 includes a first antenna 262 for direct communication with one or more of access nodes 264 via a communication links 266, a first transceiver 268, and a processor 270. For example, the relay node 260 and the communication links 266 can be an example of the relay node 106 and the air interface 112, as illustrated in FIG. 1. The relay node 260 also includes a second transceiver 272 and a second antenna 274 for wireless communication with one or more small relay nodes 276, for example, the small relay nodes 114, 116 and 118, as illustrated in FIG. 1. Although only two transceivers are depicted in the relay node 260, additional transceivers can be incorporated in order to facilitate communication with other network elements.

Figure 3:
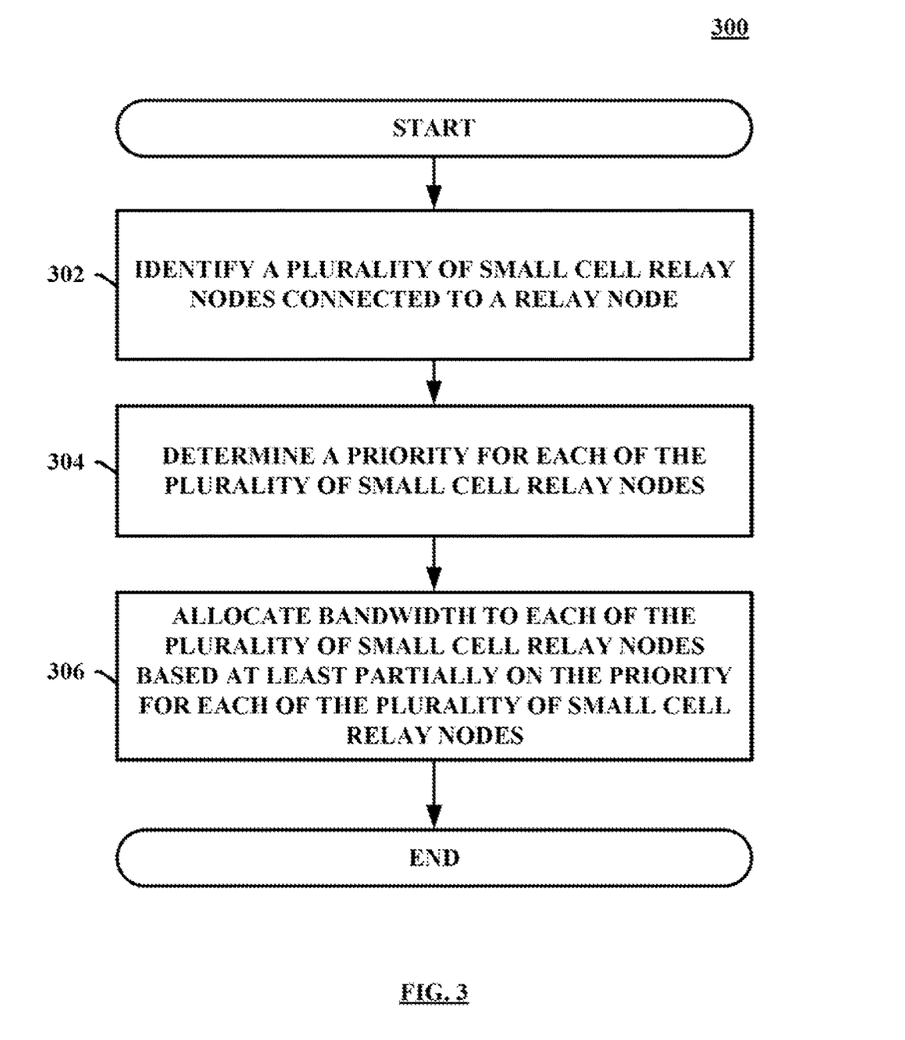
FIG. 3 depicts an example of a method for minimizing bandwidth bottlenecks in a wireless network, according to embodiments of the present disclosure.

FIG. 3 depicts an example of a method 300 for minimizing bottleneck in a wireless network using cascaded relay nodes. The method 300 of FIG. 3 can be implemented in any network node such as the access node 104, the relay node 106, and the small relay nodes 114, 116 and 118, as illustrated in FIG. 1. In other embodiments, the method 300 can be implemented with any suitable network element, for example, any network element illustrated in FIG. 1 or FIGS. 2A-2C. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the process begins, in 302, a plurality of small relay nodes, which are connected to a relay node, are identified. In some embodiments, the plurality of small cell relay nodes can be identified when each of the small cell relay nodes request connection to the relay node. For example, referring to FIG. 1, the small relay nodes 114, 116 and 118 can request a connection with the relay node 106. The relay node 106 can assign an access point name (APN), for example, a network address such as internet protocol (IP) address, to each of the small relay nodes 114, 116 and 118. In some embodiments, the plurality of small cell relay nodes can be identified after connection for the relay. For example, the bandwidth allocation can begin after more than one small cell relay node connects to the relay node. Likewise, the bandwidth allocation can begin at any time based on, for example, network conditions, wireless devices connecting to the small cell relay nodes, requests by administrators of the network, and the like.

In 304, a priority for each of the plurality of small cell relay nodes is determined. For example, once the small relay nodes 114, 116 and 118 request a connection with the relay node 106, the relay node 106 can determine a priority for each of the small relay nodes 114, 116 and 118.

In embodiments, the priority for each of the plurality of small cell relay is a value that represents a small cell relay nodes need or requirements in accessing and utilizing backhaul bandwidth provided by the relay node. For example, a higher priority can represent a higher need or requirement for backhaul bandwidth and lower priority can represent a lower need or requirement for backhaul bandwidth. In some embodiments, the priority can be any alpha numerical value that represent the relative importance or need in accessing and using the backhaul bandwidth among the small cell relay nodes.

In embodiments, priority data can be determined that indicates an amount of backhaul bandwidth, an importance in access bandwidth, and the like. In embodiments, the priority data can include data that represents utilization by each of the plurality of small cell relay nodes and types of services utilized by wireless devices connected to each of the plurality of small cell relay nodes. For instance, the utilization can represent a percentage of physical resource blocks (PRBs) utilized by each of the plurality of small cell relay nodes. Likewise, for instance, the type of services utilized can represent a quality of service (e.g., quality of service (QOS) class identifier (QCI)), that is guaranteed, offer, or provided to the wireless devices connected to each of the plurality of small cell relay nodes.

In embodiments, the priority data can be retrieved from or provided by the plurality of small cell relay nodes. For example, the relay node 106 can retrieve the priority data from the small relay nodes 114, 116 and 118. Likewise, for example, the small cell relay nodes 114, 116 and 118 can provide the priority data to the relay node 106. In embodiment, any component of the wireless network can provide and/or determine the priority data.

In embodiments, the priority can be determined from the priority data by applying the priority data to predetermined criteria and calculating the priority from the predetermined criteria. For example, the priority data can be calculated that accounts for the utilization and resources by a small cell relay node and the quality of service that needs to be delivered by the small cell relay node.

For instance, referring to FIG. 1, if the small cell relay node 114 is communicating with the wireless device 120, the wireless device 120 may be utilizing 25% of the PRBs of the small cell relay node 114 and requires a low quality of service. As such, the lower priority (e.g., "3" or "low") can be determined for the small cell relay node 114. Likewise, for instance, if the small cell relay node 118 is communicating with four wireless devices 126, the wireless devices 126 may be utilizing 90% of the PRBs of the small cell relay node 118 and two of the wireless devices 126 may require a high quality of service (e.g. voice communication, data communications, etc.) As such, the higher priority (e.g., "1" or "high") can be determined for the small cell relay node 118. Also, for instance, if the small cell relay node 116 is communicating with two wireless devices 124, the wireless devices 124 may be utilizing 50% of the PRBs of the small cell relay node 116 and one of the wireless devices 124 may require a high quality of service. As such, the medium priority (e.g., "2" or "medium") can be determined for the small cell relay node 116.

In 306, bandwidth is allocated to each of the plurality of small cell relay nodes based at least partially on the priority for each of the plurality of small cell relay nodes. In embodiments, the total bandwidth of the relay node is allocated to the each of the plurality of small cell relay nodes based on the priority among the plurality of small cell relay nodes. For example, each of the plurality of small cell relay nodes can be allocated a percentage of the total available bandwidth. In embodiments, the percentage of bandwidth allocated to among the small cell relay nodes is relative to the priorities of small cell relay nodes communicating with the relay node. The small cell relay nodes with higher priorities are assigned a higher percentage relative to lower priority small cell relay nodes. For example, if two small cell relay with high priority are communicating with a relay node, each small cell relay node can be assigned 50% of the total bandwidth. Likewise, for example, if two small cell relay nodes with a low priority are communicating with a relay node, each small cell relay node can be still be assigned 50% of the total bandwidth. For example, however, if a small cell relay node with high priority and a small cell relay node with low priority are communicating with a relay node, the small cell relay node with high priority can be allocated 80% and the small cell relay node with low priority can be allocated 20%. In other words, the particular percentages allocated can be determined based on number of small cell relay nodes and the associated priorities.

For example, the relay node 106 can allocate backhaul bandwidth for the small cell relay nodes 114, 116 and 118. Once allocated, the relay node 106 can store a record of the allocation of the backhaul bandwidth. For example, the relay node 106 can store a table that indicates the allocation of backhaul bandwidth for each small cell relay nodes 114, 116 and 118 referenced with the APN of each small cell relay nodes 114, 116 and 118. For instance, referencing the example above, the relay node 106 can allocate 50% bandwidth to the small cell relay node 118, 30% bandwidth to the small cell relay node 116, and 10% bandwidth to the small cell relay node 114.

Figure 4:
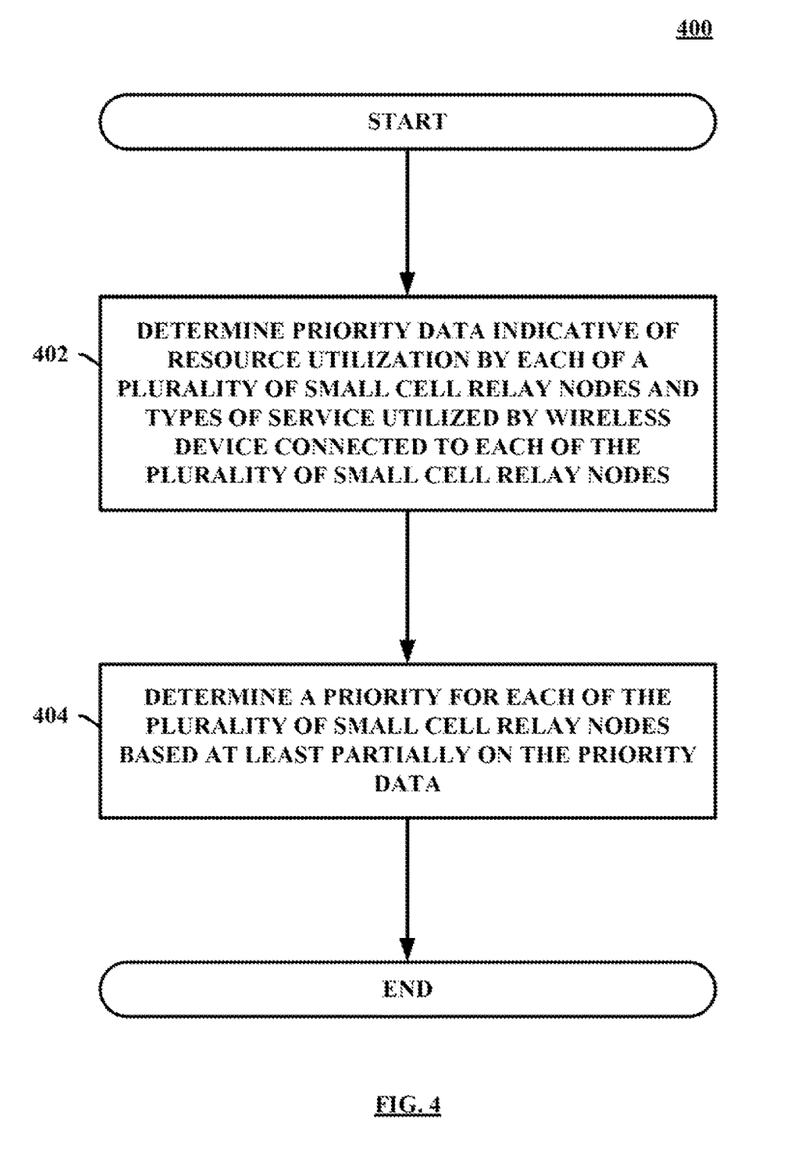
FIG. 4 depicts an example of a method for determining priority of small cell access nodes in a wireless network, according to embodiments of the present disclosure.

FIG. 4 depicts an example of a method 400 for determining priority for allocating bandwidth in a wireless network using cascaded relay nodes. The method 400 of FIG. 4 can be implemented in any network node such as the access node 104, the relay node 106, and the small relay nodes 114, 116 and 118, as illustrated in FIG. 1. In other embodiments, the method 400 can be implemented with any suitable network element, for example, any network element illustrated in FIG. 1 or FIGS. 2A-2C. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the method begins, in 402, priority data indicative of resource utilization by each of a plurality of small cell relay nodes and types of services utilized by wireless devices connected to each of the plurality of small cell relay nodes is determined. In embodiments, priority data can be determined that indicates an amount of backhaul bandwidth, an importance in access bandwidth, and the like. In embodiments, the priority data can include data that represents utilization by each of the plurality of small cell relay nodes and types of services utilized by wireless devices connected to each of the plurality of small cell relay nodes. For instance, the utilization can represent a percentage of physical resource blocks (PRBs) utilized by each of the plurality of small cell relay nodes. Likewise, for instance, the type of services utilized can represent a quality of service (e.g., quality of service (QOS) class identifier (QCI)), that is guaranteed, offer, or provided to the wireless devices connected to each of the plurality of small cell relay nodes.

In embodiments, the priority data can be retrieved from or provided by the plurality of small cell relay nodes. For example, the relay node 106 can retrieve the priority data from the small relay nodes 114, 116 and 118. Likewise, for example, the small cell relay nodes 114, 116 and 118 can provide the priority data to the relay node 106. In embodiment, any component of the wireless network can provide and/or determine the priority data.

In 404, a priority for each of the plurality of small cell relay nodes based at least partially the priority data is determined. In embodiments, the priority can be determined from the priority data by applying the priority data to predetermined criteria and calculating the priority from the predetermined criteria. For example, the priority data can be calculated that accounts for the utilization and resources by a small cell relay node and the quality of service that needs to be delivered by the small cell relay node.

In embodiments, the priority for each of the plurality of small cell relay is a value that represents a small cell relay nodes need or requirements in accessing and utilizing backhaul bandwidth provided by the relay node. For example, a higher priority can represent a higher need or requirement for backhaul bandwidth and lower priority can represent a lower need or requirement for backhaul bandwidth. In some embodiments, the priority can be any alpha numerical value that represent the relative importance or need in accessing and using the backhaul bandwidth among the small cell relay nodes.

In embodiments, the priority can be determined from the priority data by applying the priority data to predetermined criteria and calculating the priority from the predetermined criteria. For example, the priority data can be calculated that accounts for the utilization and resources by a small cell relay node and the quality of service that needs to be delivered by the small cell relay node. For example, Table 1 and Table 2 illustrate several examples of priority tables for determining priority for mini macro small cell relay nodes X, Y, Z based on PRB utilization and QCI and predetermined criteria for applying PRB utilization and QCI. In these example, the priority for the different small cell relays can be determined based on PRB Utilization of wireless devices and a percentage of wireless devices requiring a particular QCI, for example, QCI(1,5).

TABLE 1

| Mini Macro | PRB Utilization (u) | Traffic Type | Priority Type |
|---|---|---|---|
| X | u > 60% | QCI(1, 5) > 20% | HIGH |
| Y | 30% > u > 60% | 5% > QCI(1, 5) > 20% | MEDIUM |
| Z | u < 30% | QCI(1, 5) < 5% | LOW |

TABLE 2

| Mini Macro | PRB Utilization | Traffic Type | Priority Type |
|---|---|---|---|
| X | 50% | QCI(1, 5) > 20% | HIGH |
| Y | 60% | 5% > QCI(1, 5) > 20% | MEDIUM |
| Z | 70% | QCI(1, 5) < 5% | LOW |

In another example, referring to FIG. 1, if the small cell relay node 114 is communicating with the wireless device 120, the wireless device 120 may be utilizing 25% of the PRBs of the small cell relay node 114 and requires a low quality of service. As such, the lower priority (e.g., "3" or "low") can be determined for the small cell relay node 114. Likewise, for instance, if the small cell relay node 118 is communicating with four wireless devices 126, the wireless devices 126 may be utilizing 90% of the PRBs of the small cell relay node 118 and two of the wireless devices 126 may require a high quality of service (e.g. voice communication, data communications, etc.) As such, the higher priority (e.g., "1" or "high") can be determined for the small cell relay node 118. Also, for instance, if the small cell relay node 116 is communicating with two wireless devices 124, the wireless devices 124 may be utilizing 50% of the PRBs of the small cell relay node 116 and one of the wireless devices 124 may require a high quality of service. As such, the medium priority (e.g., "2" or "medium") can be determined for the small cell relay node 116.

Figure 5:
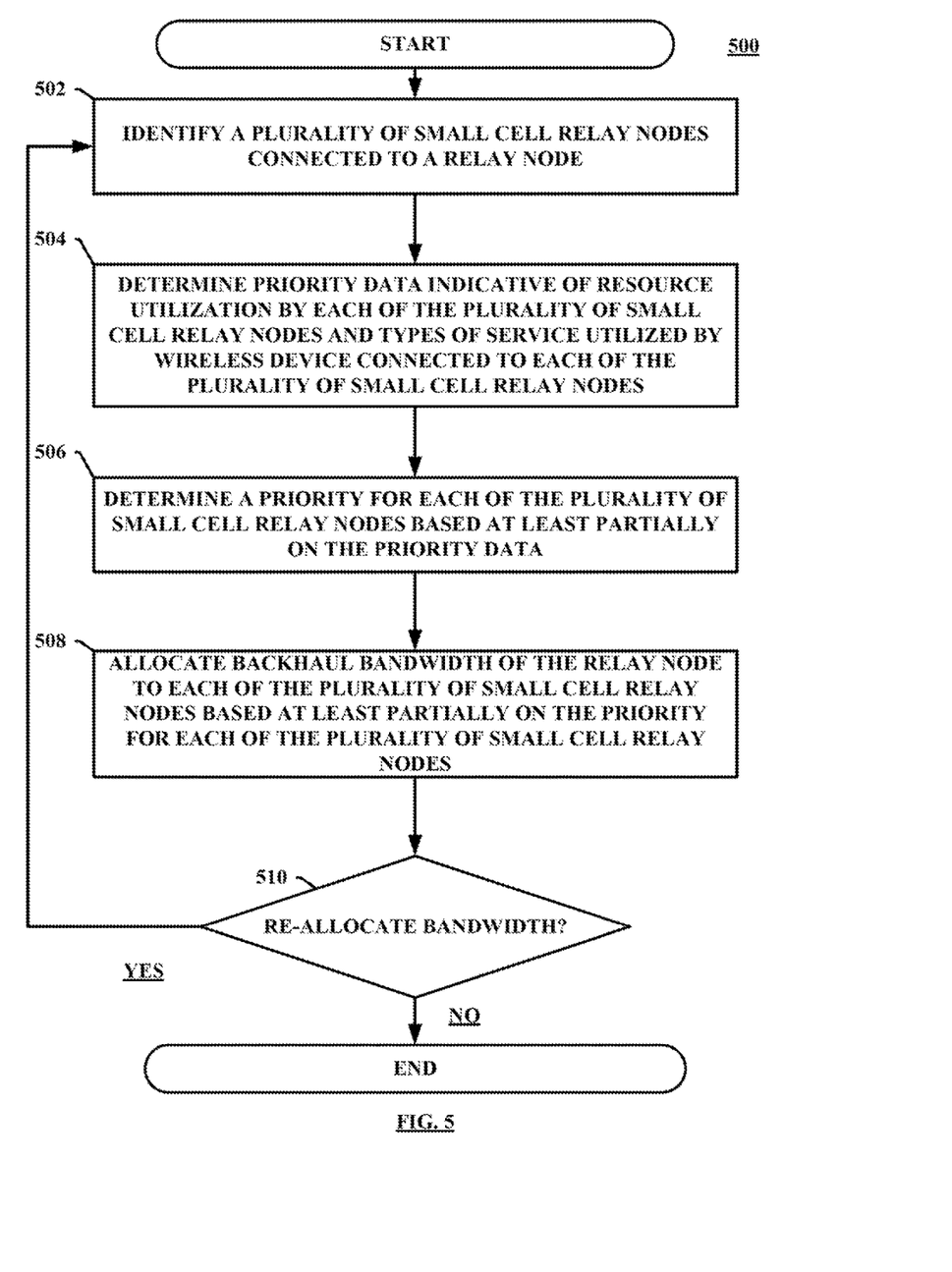
FIG. 5 depicts another example of a method for minimizing bandwidth bottlenecks in a wireless network, according to embodiments of the present disclosure.

FIG. 5 depicts another example of a method 500 for minimizing bottleneck in a wireless network using cascaded relay nodes. The method 500 of FIG. 5 can be implemented in any network node such as the access node 104, the relay node 106, and the small relay nodes 114, 116 and 118, as illustrated in FIG. 1. In other embodiments, the method 500 can be implemented with any suitable network element, for example, any network element illustrated in FIG. 1 or FIGS. 2A-2C. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

After the method begins, in 502, a plurality of small cell relay nodes connected to a relay nodes are determined. In some embodiments, the plurality of small cell relay nodes can be identified when each of the small cell relay nodes request connection to the relay node. For example, referring to FIG. 1, the small relay nodes 114, 116 and 118 can request a connection with the relay node 106. The relay node 106 can assign an access point name (APN), for example, a network address such as internet protocol (IP) address, to each of the small relay nodes 114, 116 and 118. In some embodiments, the plurality of small cell relay nodes can be identified after connection for the relay. For example, the bandwidth allocation can begin after more than one small cell relay node connects to the relay node. Likewise, the bandwidth allocation can begin at any time based on, for example, network conditions, wireless devices connecting to the small cell relay nodes, requests by administrators of the network, and the like.

In 504, priority data indicative of resource utilization by each of the plurality of small cell relay nodes and types of services utilized by wireless devices connected to each of the plurality of small cell relay nodes is determined. In embodiments, priority data can be determined that indicates an amount of backhaul bandwidth, an importance in access bandwidth, and the like. In embodiments, the priority data can include data that represents utilization by each of the plurality of small cell relay nodes and types of services utilized by wireless devices connected to each of the plurality of small cell relay nodes. For instance, the utilization can represent a percentage of physical resource blocks (PRBs) utilized by each of the plurality of small cell relay nodes. Likewise, for instance, the type of services utilized can represent a quality of service (e.g., quality of service (QOS) class identifier (QCI)), that is guaranteed, offer, or provided to the wireless devices connected to each of the plurality of small cell relay nodes.

In embodiments, the priority data can be retrieved from or provided by the plurality of small cell relay nodes. For example, the relay node 106 can retrieve the priority data from the small relay nodes 114, 116 and 118. Likewise, for example, the small cell relay nodes 114, 116 and 118 can provide the priority data to the relay node 106. In embodiment, any component of the wireless network can provide and/or determine the priority data.

In 506, a priority for each of the plurality of small cell relay nodes based at least partially the priority data is determined. In embodiments, the priority can be determined from the priority data by applying the priority data to predetermined criteria and calculating the priority from the predetermined criteria. For example, the priority data can be calculated that accounts for the utilization and resources by a small cell relay node and the quality of service that needs to be delivered by the small cell relay node.

In embodiments, the priority for each of the plurality of small cell relay is a value that represents a small cell relay nodes need or requirements in accessing and utilizing backhaul bandwidth provided by the relay node. For example, a higher priority can represent a higher need or requirement for backhaul bandwidth and lower priority can represent a lower need or requirement for backhaul bandwidth. In some embodiments, the priority can be any alpha numerical value that represent the relative importance or need in accessing and using the backhaul bandwidth among the small cell relay nodes.

For instance, referring to FIG. 1, if the small cell relay node 114 is communicating with the wireless device 120, the wireless device 120 may be utilizing 25% of the PRBs of the small cell relay node 114 and requires a low quality of service. As such, the lower priority (e.g., "3" or "low") can be determined for the small cell relay node 114. Likewise, for instance, if the small cell relay node 118 is communicating with four wireless devices 126, the wireless devices 126 may be utilizing 90% of the PRBs of the small cell relay node 118 and two of the wireless devices 126 may require a high quality of service (e.g. voice communication, data communications, etc.) As such, the higher priority (e.g., "1" or "high") can be determined for the small cell relay node 118. Also, for instance, if the small cell relay node 116 is communicating with two wireless devices 124, the wireless devices 124 may be utilizing 50% of the PRBs of the small cell relay node 116 and one of the wireless devices 124 may require a high quality of service. As such, the medium priority (e.g., "2" or "medium") can be determined for the small cell relay node 116.

In 508, backhaul bandwidth of the relay node is allocated to each of the plurality of small cell relay nodes based at least partially on the priority for each of the plurality of small cell relay nodes. In embodiments, the total backhaul bandwidth of the relay node is allocated to the each of the plurality of small cell relay nodes based on the priority among the plurality of small cell relay nodes. For example, each of the plurality of small cell relay nodes can be allocated a percentage of the total available backhaul bandwidth. In embodiments, the percentage of backhaul bandwidth allocated to among the small cell relay nodes is relative to the priorities of small cell relay nodes communicating with the relay node. The small cell relay nodes with higher priorities are assigned a higher percentage relative to lower priority small cell relay nodes. For example, if two small cell relay with high priority are communicating with a relay node, each small cell relay node can be assigned 50% of the total backhaul bandwidth. Likewise, for example, if two small cell relay nodes with a low priority are communicating with a relay node, each small cell relay node can still be assigned 50% of the total backhaul bandwidth. For example, however, if a small cell relay node with high priority and a small cell relay node with low priority are communicating with a relay node, the small cell relay node with high priority can be allocated 80% and the small cell relay node with low priority can be allocated 20%. In other words, the particular percentages allocated can be determined based on number of small cell relay nodes and the associated priorities.

For example, the relay node 106 can allocate backhaul bandwidth for the small cell relay nodes 114, 116 and 118. Once allocated, the relay node 106 can store a record of the allocation of the backhaul bandwidth. For example, the relay node 106 can store a table that indicates the allocation of backhaul bandwidth for each small cell relay nodes 114, 116 and 118 referenced with the APN of each small cell relay nodes 114, 116 and 118. For instance, referencing the example above, the relay node 106 can allocate 50% bandwidth to the small cell relay node 118, 30% bandwidth to the small cell relay node 116, and 10% bandwidth to the small cell relay node 114

In 510, it can be determined whether the backhaul bandwidth should be re-allocated. In embodiments, it can be determined if a change has occurred in the plurality of small cell relay nodes or wireless devices connected to the plurality of small cell relay nodes. For example, new small cell relay nodes can connect to the relay node, wireless devices can connect or disconnect from the plurality of small cell relay nodes, an operating mode of the plurality of small cell relay nodes and/or the wireless devices can occur, and the like which may lead to a need to re-allocate backhaul bandwidth. If no change occurs and the allocation is over, the process can end. If a change occurs, the method 500 can return to 502 and repeat to determine a new backhaul bandwidth allocation.

In embodiments, the rely node can monitor the plurality of small cell relay nodes for a change. For example, the rely node 106 can monitor the small relay nodes 114, 116 and 118. The monitoring can occur periodically, on-demand, and the like. In some embodiments, the plurality of small cell relay nodes can notify the relay node of a change in the plurality of small cell relay nodes or the wireless device.

The methods, systems, devices, networks, access nodes, and equipment described above can be implemented with, contain, or be executed by one or more computer systems and/or processing nodes. The methods described above can also be stored on a non-transitory computer readable medium. Many of the elements described herein can be, comprise, or include computers systems and/or processing nodes. This includes, but is not limited to: the access node 104, the controller node 108, the gateway node 110, the wireless device 106, the relay node 106, the small relay nodes 114, 116 and 118 and/or the network 102.

Figure 6:
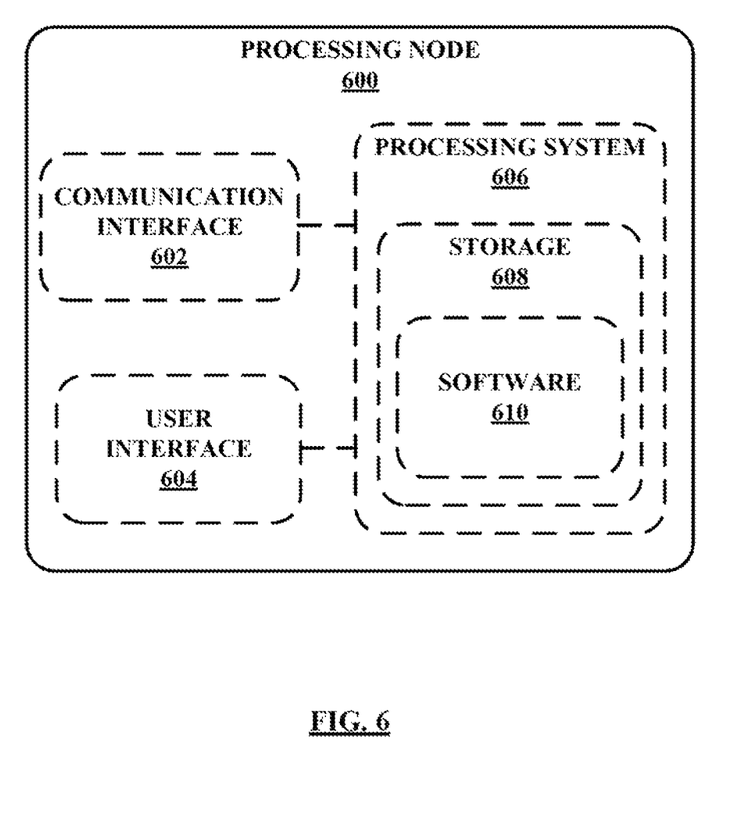
FIG. 6 depicts an example of a processing node for minimizing interference in a wireless network, according to embodiments of the present disclosure.

FIG. 6 depicts an example of a processing node 600. The processing node 600 includes a communication interface 602, a user interface 604, and, a processing system 606 in communication with the communication interface 602 and the user interface 604. The processing system 606 includes storage 608, which can comprise a disk drive, flash drive, memory circuitry, or other memory device. The storage 608 can store software 610, which is used in the operation of the processing node 600. The storage 608 can include a disk drive, flash drive, data storage circuitry, or some other memory apparatus. For example, the storage 608 can include a buffer. The software 610 can include computer programs, firmware, or some other form of machine-readable instructions, including an operating system, utilities, drivers, network interfaces, applications, or some other type of software. For example, the software 610 can include instructions to implement the bandwidth allocation unit 218, as described above. The processing system 606 can include a microprocessor and other circuitry to retrieve and execute the software 610 from the storage 608. The processing node 606 can further include other components such as a power management unit, a control interface unit, etc., which are omitted for clarity. The communication interface 602 permits the processing node 600 to communicate with other network elements. The user interface 604 permits the configuration and control of the operation of the processing node 600.

The examples of systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium can include, for example, modulated signals transmitted through wired or wireless transmission paths.

While the teachings have been described with reference to examples of the embodiments thereof, those skilled in the art will be able to make various modifications to the described embodiments without departing from the true spirit and scope. The terms and descriptions used herein are set forth by way of illustration only and are not meant as limitations. In particular, although the processes have been described by examples, the stages of the processes can be performed in a different order than illustrated or simultaneously. Furthermore, to the extent that the terms "including", "includes", "having", "has", "with", or variants thereof are used in the detailed description, such terms are intended to be inclusive in a manner similar to the term "comprising." As used herein, the terms "one or more of" and "at least one of" with respect to a listing of items such as, for example, A and B, means A alone, B alone, or A and B. Further, unless specified otherwise, the term "set" should be interpreted as "one or more." Also, the term "couple" or "couples" is intended to mean either an indirect or direct connection. Thus, if a first device couples to a second device, that connection can be through a direct connection, or through an indirect connection via other devices, components, and connections.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for improving service in a wireless network, the method comprising:
    identifying a plurality of small cell relay nodes connected to a relay node;
    determining priority data indicative of resource utilization by each of the plurality of small cell relay nodes and types of services utilized by wireless devices connected to each of the plurality of small cell relay nodes;
    determining a priority for each of the plurality of small cell relay nodes based at least partially the priority data; and
    allocating backhaul bandwidth of the relay node to each of the plurality of small cell relay nodes based at least partially on the priority for each of the plurality of small cell relay nodes, wherein allocating the backhaul bandwidth comprises:
        allocating a percentage of total backhaul bandwidth of the relay node based on relative values of the priority of each of the each of the plurality of small cell relay nodes.

2. The method of claim 1, wherein the resource utilization comprises a percentage of physical resource blocks utilized by each of the plurality of small cell relay nodes.

3. The method of claim 1, wherein the types of services comprise a quality of service guaranteed to the wireless devices connected to each of the plurality of small cell relay nodes.

4. The method of claim 1, the method further comprising:
    determining a change in one of the wireless devices connected to each of the plurality of small cell relay nodes or a change in one of the plurality of small cell relay nodes;
    determining a new priority for each of the plurality of small cell relay nodes based at least partially on the change in one of the wireless devices connected to each of the plurality of small cell relay nodes or the change in one of the plurality of small cell relay nodes; and
    re-allocating the backhaul bandwidth to each of the plurality of small cell relay nodes based at least partially on the new priority for each of the plurality of small cell relay nodes.

5. The method of claim 4, the method further comprising:
    periodically querying the plurality of small cell relay nodes to determine the change in one of the wireless devices connected to each of the plurality of small cell relay nodes or the change in one of the plurality of small cell relay node.

6. The method of claim 1, wherein small cell relay nodes from the plurality of small cell relay nodes with a higher relative value of the priority are allocated a higher percentage of the total backhaul bandwidth.

7. The method of claim 1, the method further comprising:
    storing the priority of each of the plurality of small cell relay nodes associated with a network identification of each of the plurality of small cell relay nodes.

8. A system for minimizing interference in a wireless network, the system comprising:
    a processing node; and
    a processor coupled to the processing node, the processor configuring the processing node to
        determine priority data indicative of resource utilization by each of a plurality of small cell relay nodes and types of services utilized by wireless devices connected to each of the plurality of small cell relay nodes; and
        determine a priority for each of the plurality of small cell relay nodes based at least partially the priority data, wherein the priority for each of the plurality of small cell relay nodes is utilized to allocate backhaul bandwidth of a relay node connected to the plurality of small cell relay nodes and wherein a percentage of total backhaul bandwidth of the relay node is allocated based on relative values of the priority of each of the each of the plurality of small cell relay nodes.

9. A processing node for improving service in a wireless network, the processing node being configured to perform operations comprising:
    identifying a plurality of small cell relay nodes connected to a relay node;
    determining a priority for each of the plurality of small cell relay nodes, wherein the priority determined for each of the plurality of small cell relay nodes is based at least partially on resource utilization by each of the plurality of small cell relay nodes and types of services utilized by wireless devices connected to each of the plurality of small cell relay nodes; and
    allocating bandwidth to each of the plurality of small cell relay nodes based at least partially on the priority for each of the plurality of small cell relay nodes, wherein allocating the backhaul bandwidth comprises:
        allocating a percentage of total backhaul bandwidth of the relay node based on relative values of the priority of each of the each of the plurality of small cell relay nodes.

10. The processing node of claim 9, wherein the resource utilization comprises a percentage of physical resource blocks utilized by each of the plurality of small cell relay nodes.

11. The processing node of claim 9, wherein the types of services comprise a quality of service guaranteed to the wireless devices connected to each of the plurality of small cell relay nodes.

12. The processing node of claim 9, the operations further comprising:
    determining data indicative of the resource utilization by each of the plurality of small cell relay nodes and the types of services utilized by the wireless devices connected to each of the plurality of small cell relay nodes.

13. The processing node of claim 12, wherein determining the resource utilization and the types of service utilized comprises:
    receiving, from the each of the plurality of small cell relay nodes, the data indicative of the resource utilization by each of the plurality of small cell relay nodes and the types of services utilized by the wireless devices connected to each of the plurality of small cell relay nodes.

14. The processing node of claim 9, the operations further comprising:

determining a change in one of the wireless devices connected to each of the plurality of small cell relay nodes or a change in one of the plurality of small cell relay nodes;

determining a new priority for each of the plurality of small cell relay nodes based at least partially on the change in one of the wireless devices connected to each of the plurality of small cell relay nodes or the change in one of the plurality of small cell relay nodes; and re-allocating the bandwidth to each of the plurality of small cell relay nodes based at least partially on the new priority for each of the plurality of small cell relay nodes.

\* \* \* \* \*